United States Patent
Pong (10) Patent No.: US 7,653,070 B2
(45) Date of Patent: Jan. 26, 2010

(54) METHOD AND SYSTEM FOR SUPPORTING EFFICIENT AND CACHE-FRIENDLY TCP SESSION LOOKUP OPERATIONS BASED ON CANONICALIZATION TAGS

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 551 days.

(21) Appl. No.: 11/228,060

(22) Filed: Sep. 16, 2005

(65) Prior Publication Data
US 2006/0274762 A1     Dec. 7, 2006

Related U.S. Application Data

(60) Provisional application No. 60/688,298, filed on Jun. 7, 2005.

(51) Int. Cl.
*H04L 12/28* (2006.01)
*H04J 3/16* (2006.01)
*G06F 15/16* (2006.01)

(52) U.S. Cl. .................. 370/400; 370/412; 370/469; 709/230; 709/245; 711/167

(58) Field of Classification Search ......... 370/230–235, 370/395–419, 466–469, 389–392; 709/230–245, 709/224–226; 711/167–169, 134–136, 3–5, 711/118–128, 170–173
See application file for complete search history.

(56) References Cited

U.S. PATENT DOCUMENTS

| | | | |
|---|---|---|---|
| 5,410,669 A * | 4/1995 | Biggs et al. ................. | 711/118 |
| 5,581,725 A * | 12/1996 | Nakayama .................. | 711/122 |
| 5,584,002 A * | 12/1996 | Emma et al. .................. | 711/3 |
| 6,125,399 A * | 9/2000 | Hamilton ..................... | 709/245 |
| 6,449,694 B1 * | 9/2002 | Burgess et al. .............. | 711/128 |
| 6,606,686 B1 * | 8/2003 | Agarwala et al. ........... | 711/129 |
| 6,956,858 B2 * | 10/2005 | Hariguchi et al. ....... | 370/395.31 |
| 6,993,637 B1 * | 1/2006 | Kwong ........................ | 711/167 |
| 7,076,626 B2 * | 7/2006 | Saito et al. .................. | 711/165 |
| 7,254,637 B2 * | 8/2007 | Pinkerton et al. ........... | 709/230 |
| 7,284,096 B2 * | 10/2007 | Schreter ..................... | 711/136 |
| 7,289,445 B2 * | 10/2007 | Illikkal et al. ............... | 370/235 |
| 7,436,853 B2 * | 10/2008 | Basso et al. ................. | 370/469 |
| 2005/0100034 A1 * | 5/2005 | Basso et al. ................. | 370/412 |
| 2006/0168390 A1 * | 7/2006 | Speier et al. ................... | 711/5 |
| 2006/0277352 A1 * | 12/2006 | Pong ............................. | 711/3 |
| 2007/0195797 A1 * | 8/2007 | Patel et al. ................... | 370/400 |

* cited by examiner

*Primary Examiner*—Man Phan
(74) *Attorney, Agent, or Firm*—McAndrews, Held & Malloy, Ltd.

(57) ABSTRACT

Aspects of a method and system for efficient and cache-friendly TCP session lookup operations based on canonicalization tags are presented. Aspects of the method may include searching a plurality of tag fields, retrieved via a single memory read operation, to locate a reference to a control block that includes context information for a communication session. Aspects of the system may include a processor that searches a plurality of tag fields, retrieved via a single memory read operation, to locate a reference to a control block that includes context information for a communication session.

12 Claims, 9 Drawing Sheets

METHOD AND SYSTEM FOR SUPPORTING EFFICIENT AND CACHE-FRIENDLY TCP SESSION LOOKUP OPERATIONS BASED ON CANONICALIZATION TAGS

CROSS-REFERENCE TO RELATED APPLICATIONS/INCORPORATION BY REFERENCE

This application makes reference, claims priority to, and claims the benefit of U.S. Provisional Application Ser. No. 60/688,298 filed Jun. 7, 2005.

This application makes reference to:
U.S. patent application Ser. No. 11/228,363, filed Sep. 16, 2005;
U.S. patent application Ser. No. 11/228,362, filed Sep. 16, 2005;
U.S. patent application Ser. No. 11/228,863, filed Sep. 16, 2005;
U.S. patent application Ser. No. 11/228,163, filed Sep. 16, 2005;
U.S. patent application Ser. No. 11/228,398, filed Sep. 16, 2005; and
U.S. patent application Ser. No. 11/228,059, filed Sep. 16, 2005.

All of the above stated applications are hereby incorporated herein by reference in their entirety.

FIELD OF THE INVENTION

Certain embodiments of the invention relate to data processing. More specifically, certain embodiments of the invention relate to a method and system for efficient and cache-friendly TCP session lookup operations based on canonicalization tags.

BACKGROUND OF THE INVENTION

Communications networks, such as the Internet, provide a transmission medium that enables personal computers, workstations, and other computing and communications devices to exchange information. A communication may involve a transmitting station, which transmits information via a network, and one or more receiving stations, which receive the information via the network. The process of communication via a network may comprise a plurality of tasks. Examples of tasks may include identifying an applications program that is requesting to transmit data, establishing a session which may distinguish a current request from a subsequent request that may be issued by the application program, and affixing a label to the transmitted data that identifies the transmitting station and the receiving stations. Additional tasks may include partitioning the transmitted data into a plurality data sub-units, and affixing a subsequent label that comprises addressing information that may be utilized by the network to direct each of the plurality of data sub-units in a communication path between the transmitting station and the receiving station, via the network. Other tasks may involving encoding each of the plurality of data sub-units as binary information that may be transmitted via electrical or optical pulses of energy via a transmission medium.

An individual task may be referred to as a protocol. The protocol associated with communications via a network may be implemented in software and executed by a processor within a transmitting station or receiving station. In many implementations, the software may be partitioned into a plurality of software modules where a software module may perform tasks related to one or more protocols. A protocol may be defined based on a protocol reference model (PRM) such as defined, for example, by the International Organization for Standardization (ISO). A protocol defined within a PRM may be referred to as a protocol layer, or layer. The separation of software into protocol software modules may increase the flexibility of software development by enabling a software module to be developed to perform specific function that are related to a protocol layer. Thus, changes in the functionality of a subsequent protocol layer, which may require modifications to software modules that perform functions related to one protocol layer, may not require modifications to software modules that perform functions related to another protocol layer.

Two protocols that may be utilized for communications via a network are the transmission control protocol (TCP) and the Internet protocol (IP). TCP provides a means by which transmitted data, which may be referred to as a packet, may be reliably transmitted between a transmitting station and a receiving station via a network connection. A transmitted TCP packet may comprise information that indicates, to a receiving station, an application, executing at the transmitting station, which transmitted the data. The transmitted TCP packet may also comprising information that indicates an application, executing at the receiving station, which is to receive the data. The transmitted TCP packet may comprise sequence number information that enables a receiving station to determine the order in which a plurality of TCP packets were transmitted by the transmitting station. The receiving station that receives the currently transmitted TCP packet may have previously transmitted a TCP packet to the transmitting station that is transmitting the current TCP packet. The currently transmitted TCP packet may comprise acknowledgement information that indicates a sequence number associated with a TCP packet that was received by the transmitted station, which had been previously transmitted by the receiving station that is to receive the currently transmitted TCP packet. TCP may assert flow control upon communications between a transmitting station and a receiving station by limiting the number of TCP packets that may be transmitted by the transmitting station to the receiving station. TCP flow control may enable a transmitting station to cease transmission of subsequent TCP packets until acknowledgement information is received from the receiving station that indicates that at least a portion of the previously transmitted TCP packets have been received by the receiving station.

IP provides a means by which TCP may transmit TCP packets via the network. The TCP packet may be contained within an IP datagram that comprises information utilized to transmit the IP datagram via the network. The IP datagram may comprise a source address that is associated with the transmitting station, and a destination address that is associated with the receiving station. The source address and/or destination address may be addresses that identify the transmitting station and/or receiving station within the network. The IP datagram may comprise protocol information that indicates that it contains a TCP packet.

Information that comprises sequence number information and/or acknowledgement information, may be referred to as state information. State information may be maintained within a transport control block (TCB) at the transmitting station and/or receiving station that are engaged in an exchange of information via a network. An individual exchange of information may be referred to as a session. A received TCP packet and/or IP datagram, for example, may comprise information that identifies a TCB. The TCB may be associated with a TCP session, for example. Upon receipt of the TCP packet and/or IP datagram, for example, the receiving station may initiate a process to locate a corresponding TCB. This process may comprise performing a lookup operation to locate the TCB. The TCB may be associated with a network connection that is utilized when receiving the packet via the network. The TCB may comprise a data structure that maintains state information about the network connection.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for efficient and cache-friendly TCP session lookup operations based on canonicalization tags, substantially as shown in and/or described in connection with at least one of the Figures, and set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for efficient and cache-friendly TCP session lookup operations based on canonicalization tags. Various aspects of the invention may provide a caching scheme that may facilitate lookup operations to locate a transport control block (TCB). A method that efficiently utilizes cache resources may be referred to as being "cache friendly". Aspects of the invention may comprise searching a plurality of tag fields, or tags, retrieved via a single memory read operation, to locate a reference to a control block that comprises context information for a communication session. The tag fields may be retrieved based on a hash index that is computed based on packet header information. The hash index may be utilized to access an entry in a lookup table. A plurality of tags may be retrieved from the entry. The tag may be utilized to locate a TCB.

Figure 1A:
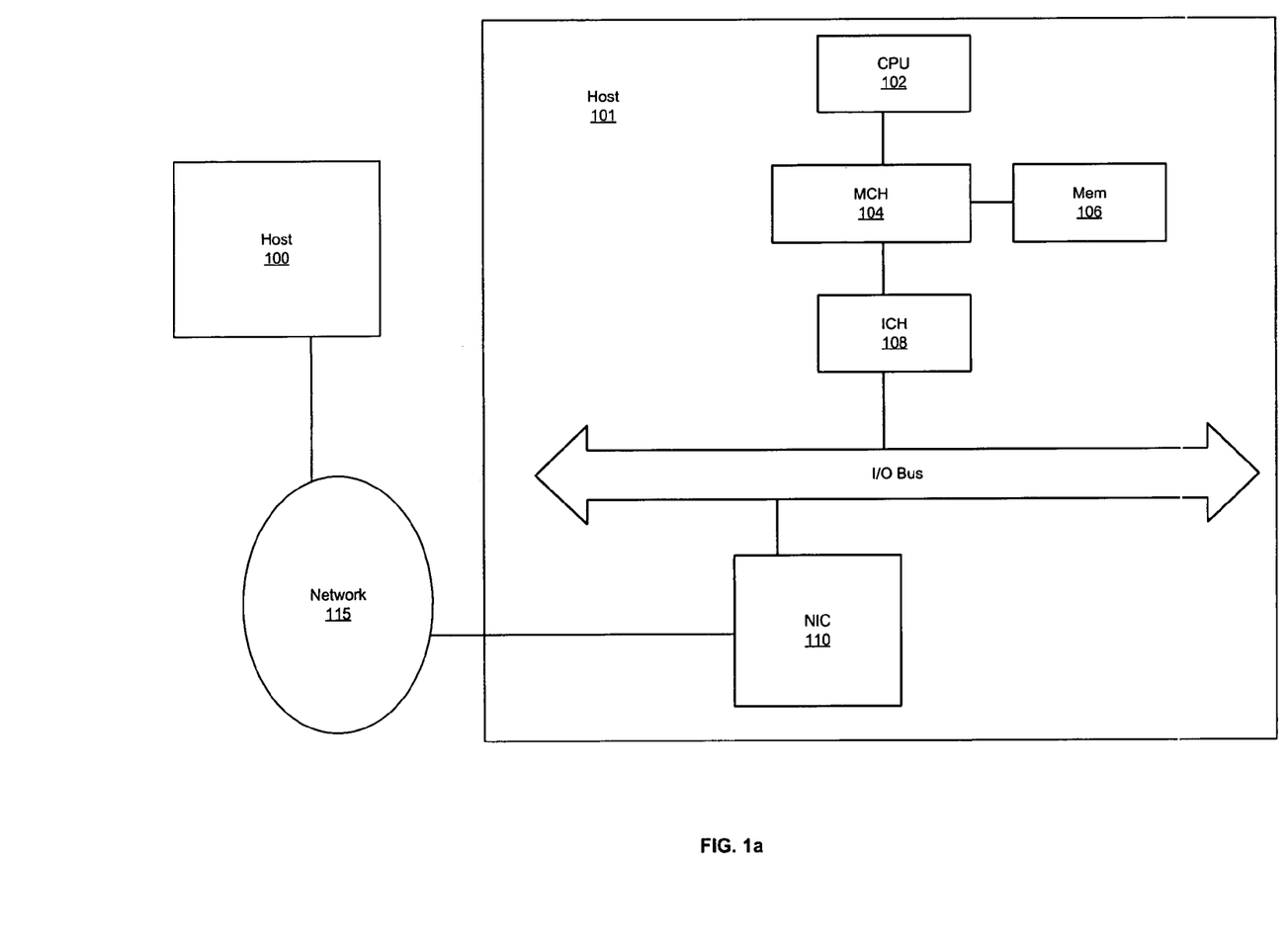
FIG. 1a is a block diagram of an exemplary system that may connect to a network, which may be utilized in connection with an embodiment of the invention.

FIG. 1a is a block diagram of an exemplary system that may connect to a network, which may be utilized in connection with an embodiment of the invention. Referring to FIG. 1a, there is shown hosts 100 and 101, and a network 115. The host 101 may comprise a central processing unit (CPU) 102, a memory interface (MCH) 104, a memory block 106, an input/output (IO) interface (ICH) 108, and a network interface card (NIC) 110.

The memory interface (MCH) 104 may comprise suitable circuitry and/or logic that may be adapted to transfer data between the memory block 106 and other devices, for example, the CPU 102.

Figure 3:
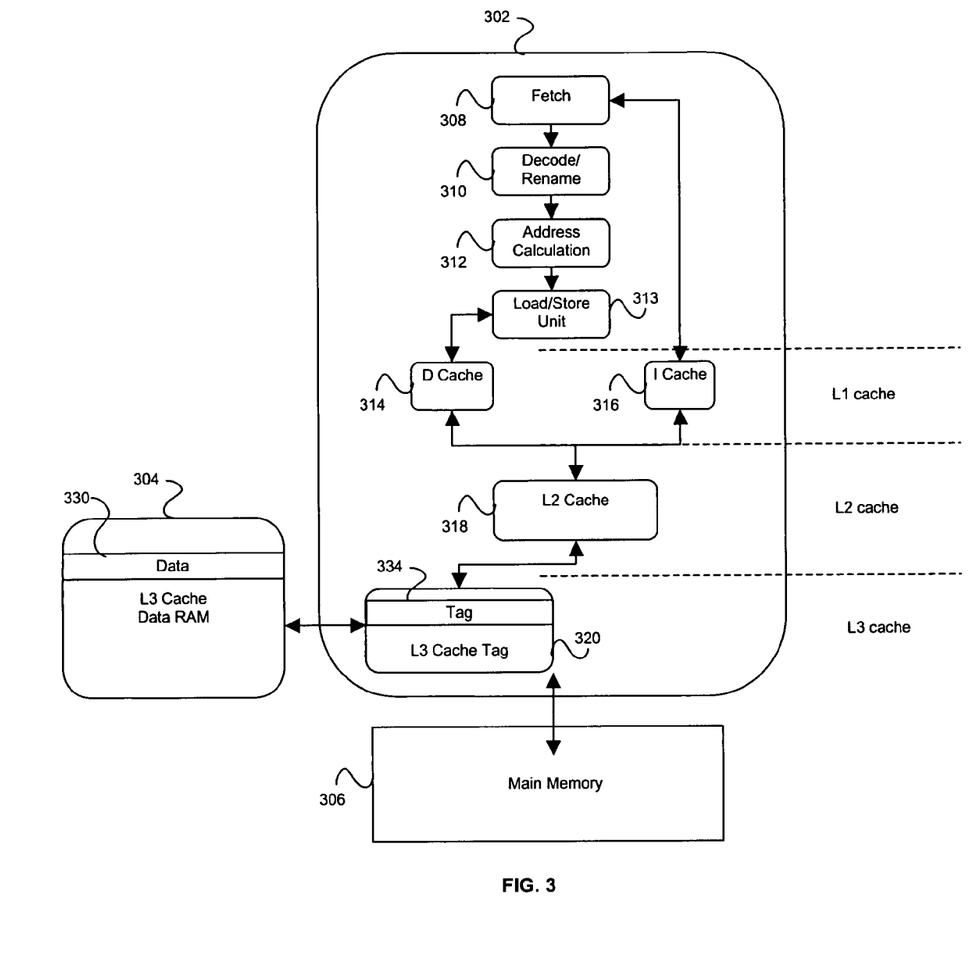
FIG. 3 is a block diagram of an exemplary processor system that utilizes cache memory, which may be utilized in connection with an embodiment of the invention.

The memory block 106 may comprise main memory and cache memory. Cache memory may comprise memory that is characterized by reduced latency and/or increased data transfer rate when compared to main memory. As such, cache memory, also referred to as a cache, may be described as being "faster" than main memory. An exemplary memory organization comprising cache memory and main memory is illustrated in FIG. 3.

The input/output interface (ICH) 108 may comprise suitable circuitry and/or logic that may be adapted to transfer data between IO devices, between an IO device and the memory block 106, or between an IO device and the CPU 102.

The network interface chip/card (NIC) 110 may comprise suitable circuitry, logic and/or code that may be adapted to transmit and receive data from a network, for example, an Ethernet network. The NIC 110 may process received data and/or data to be transmitted. The amount of processing may be design and/or implementation dependent. Generally, the NIC 110 may comprise a single chip that may also utilize on-chip memory and/or off-chip memory.

In operation, the host 100 and the host 101 may communicate with each other via, for example, the network 115. The network 115 may be an Ethernet network. Accordingly, the host 100 and/or 101 may send and/or receive packets via a network interface card, for example, the NIC 110. For example, the CPU 102 may fetch instructions from the memory block 106 and execute those instructions. The CPU 102 may additionally store and/or retrieve data in the memory block 106. Execution of instructions may comprise transferring data with other components, for example, the NIC 110. For example, a software application running on the CPU 102 may have data to transmit to a network, for example, the network 115. An example of the software application may be email sent between the hosts 100 and 101.

Accordingly, the CPU 102 in the host 101 may process data in an email and communicate the processed data to the NIC 110. The data may be communicated to the NIC 110 directly by the CPU 102. Alternatively, the data may be stored in the memory block 106. The stored data may be transferred to the NIC 110 via, for example, a direct memory access (DMA) process. Various parameters needed for the DMA, for example, the source start address, the number of bytes to be transferred, and the destination start address, may be written by the CPU 102 to, for example, the memory interface (MCH) 104. Upon a start command, the memory interface (MCH) 104 may start the DMA process. In this regard, the memory interface (MCH) 104 may act as a DMA controller.

The NIC 110 may further process the email data and transmit the email data as packets in a format suitable for the network 115 to which it is connected. Similarly, the NIC 110 may receive packets from the network 115 to which it is connected. The NIC 110 may process data in the received packets and communicate the processed data to higher protocol processes that may further process the data. The processed data may be stored in the memory block 106, via the IO interface (ICH) 108 and the memory interface (MCH) 104. The data in the memory block 106 may be further processed by the email application running on the CPU 102 and finally displayed as a, for example, text email message for a user on the host 101.

Figure 1B:
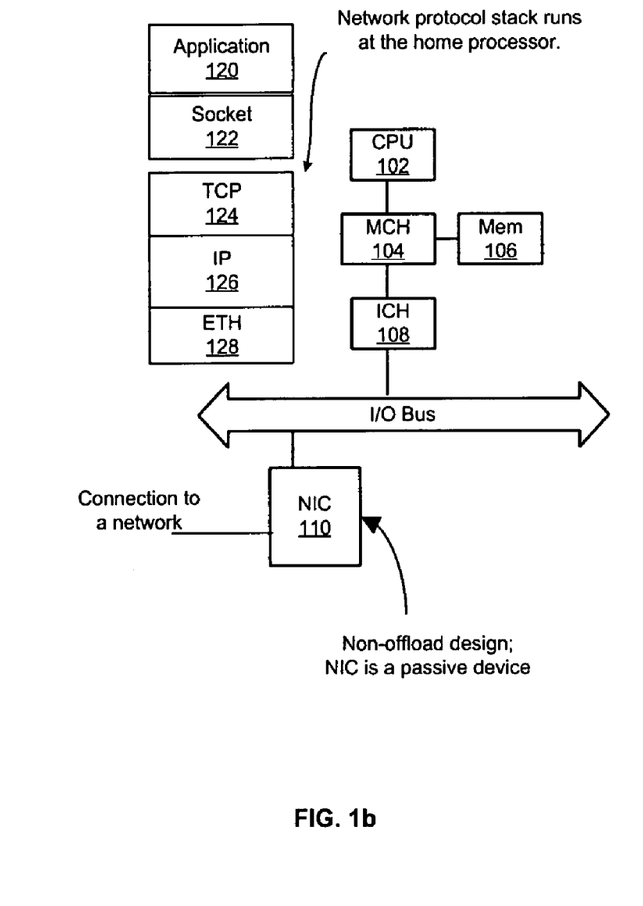
FIG. 1b is a block diagram of an exemplary system for a non-offloaded Internet protocol stack, which may be utilized in connection with an embodiment of the invention.

FIG. 1*b* is a block diagram of an exemplary system for a non-offloaded Internet protocol stack, which may be utilized in connection with an embodiment of the invention. Referring to the FIG. 1*b*, there is shown the host 101 that may comprise the CPU 102, the MCH 104, the memory block 106, the ICH 108, and the NIC 110. There is also shown an application layer 120, a socket 122, a transport layer 124, a network layer 126, and a data link layer 128.

The application layer 120, the transport layer 124, the network layer 126, and the data link layer 128 may comprise a protocol stack for receiving and transmitting data from a network. The protocol stack may be, for example, the Internet protocol (IP) suite used by the Internet network. The IP suite may comprise an application layer, for example, the application layer 120, a transport layer, for example, the transport layer 124, a network layer, for example, the network layer 126, a data link layer, for example, the data link layer 128, and a physical layer. The socket 122 may comprise a software process that may allow transfer of data between two other software processes. Accordingly, the socket 122 may be thought of as a conduit for transfer of data between the application layer 120 and the transport layer 124. The physical layer may be the medium that connects one host on a network to another host. For example, the medium may be cables that serve to conduct the network signals in a network, for example, an Ethernet network.

When receiving email, the data received may be received by the NIC 110 from the physical layer, for example, the Ethernet network, as a series of packets. The NIC 110 may store the received packets to the memory bock 106. The CPU 102 may, for example, execute the data link layer 128 protocol to, for example, remove the physical layer framing from each packet. The framing may comprise node addresses, and bit patterns that may indicate the start and end of each packet. The CPU 102 may then, for example, execute the next layer of protocol in the protocol stack. This layer may be, for example, network layer 126, and may comprise removing the network related information from each packet that may be used to route the packets from one network to another. The next layer of protocol to be executed may be the transport layer 124. The transport layer 124 may, for example, ensure that all packets for a file have been received, and may assemble the various packets in order.

The assembled file may then be processed by the application layer 120 protocol. The application layer 120 protocol may be a part of an application, for example, an email application. The application layer 120 protocol may, for example, ensure that data format may be the format used by the application. For example, the characters in the email message may have been encoded using the ASCII format, rather than the EBCDIC format.

When transmitting data to the network, the protocol stack may be traversed in the other direction. For example, from the application layer 120 to the transport layer 124, then to the network layer 126, then to the data link layer 128, and finally to the physical layer. The application layer 120 may encode the application file to a standard format for this type of application. The transport layer 124 may separate the file into packets, and each packet may be identified so that the corresponding transport layer at the receiving host may be able to re-assemble the received packets in order. The network layer 126 may encapsulate the packets from the transport layer 124 in order to be able to route the packets to a desired destination, which may be in a different network. The data link layer 128 may provide framing for the packets so that they may be addressed to a specific node in a network.

Figure 1C:
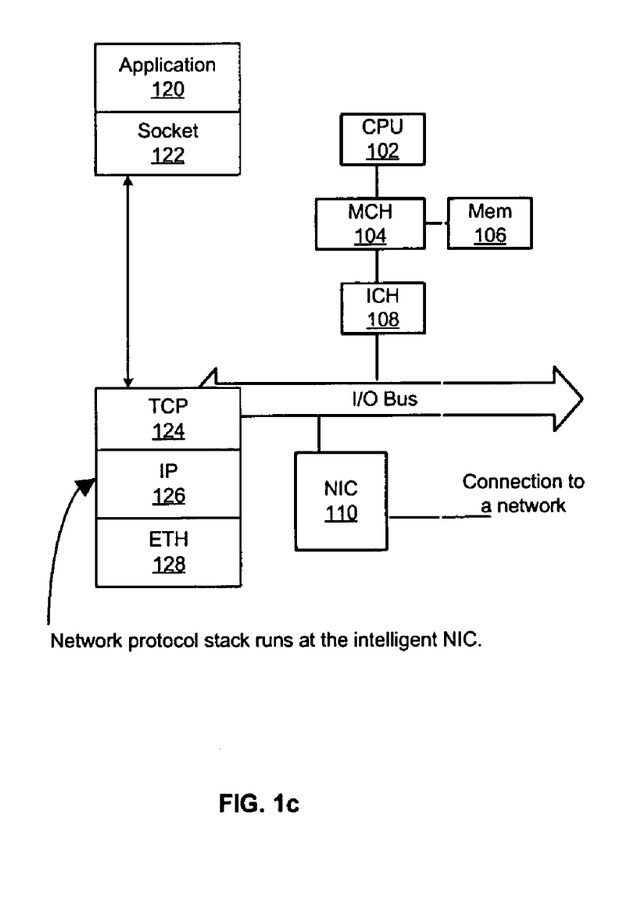
FIG. 1c is a block diagram of an exemplary system for an Internet protocol stack with an intelligent network interface card, which may be utilized in connection with an embodiment of the invention.

FIG. 1*c* is a block diagram of an exemplary system for an Internet protocol stack with an intelligent network interface card, which may be utilized in connection with an embodiment of the invention. Referring to FIG. 1*c*, there is shown a diagram similar to the diagram in FIG. 1*b*. However, the protocol stack may be separated. For example, the transport layer 124, the network layer 126, and the data link layer 128 may be executed by the NIC 110, rather than by the CPU 102 as in FIG. 1*b*. The NIC 110 may be referred to as an intelligent NIC since it may handle some of the protocol stack processing, for example, the transport layer 124, internet protocol (IP) for the network layer 126, and Ethernet protocol for the data link layer 128. This may free the CPU 102, which may only have to process the socket 122 and the application layer 120 protocol, to allocate more time to handle application software. Accordingly, an application software user may receive better responses from the application software. Implementations of intelligent NIC, for example, the NIC 110, may rely on embedded processors and firmware to handle network protocol stack.

Figure 2:
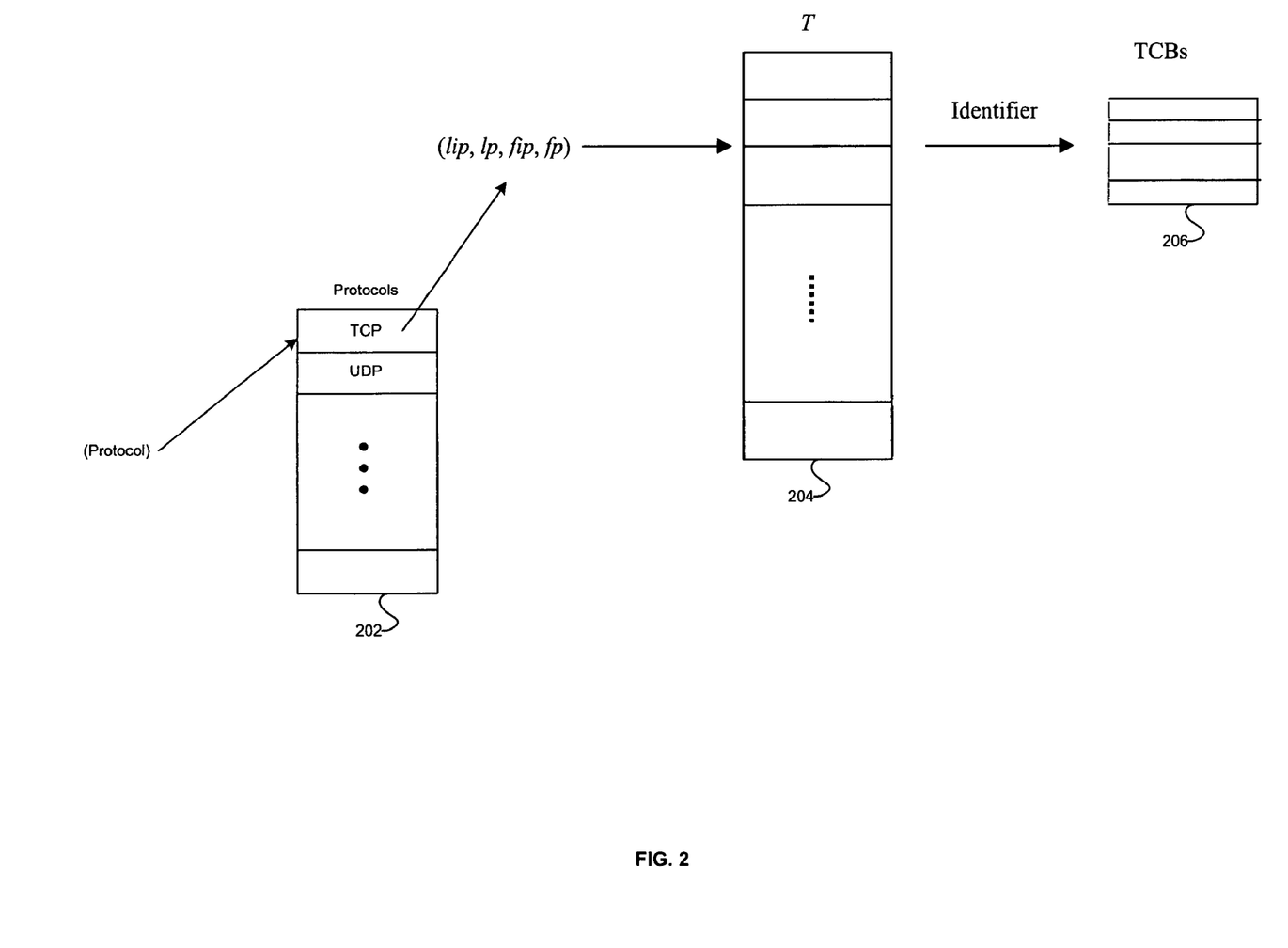
FIG. 2 is a block diagram illustrating an exemplary method for table lookup of a referenced TCB that may be utilized in connection with an embodiment of the invention.

FIG. 2 is a block diagram illustrating an exemplary method for table lookup of a referenced TCB that may be utilized in connection with an embodiment of the invention. Referring to FIG. 2 there is shown a protocols table 202, a table of TCB pointers 204, and a referenced TCB 206. The protocols table 202 may comprise information that is associated with one or more communications protocols that may be utilized by a host 101 to communicate information via a network 115. The table of TCB pointers 204 may comprise one or more entries. The table of TCB pointers may also be referred to as a lookup table. An entry in the table of TCB pointers may comprise information that may be utilized to locate a TCB 206. For example, an entry may comprise a plurality of tags, one of which may be utilized to identify an address that corresponds to a location within system memory 106 wherein a referenced TCB 206 may be stored. The TCB 206 may comprise a data structure that contains state information associated with a network connection, for example, or other communication between host 100 and host 101, via a network 115.

In operation, a host 101, which utilizes TCP and/or IP for example, to exchange information via a network, may extract information from a received packet. The structure of the received packet may be defined in the relevant Internet Engineering Task Force (IETF) specification for TCP and/or IP, for example. These elements comprise a protocol identifier, a local internet protocol (IP) address, lip, a local port number, lp, a foreign IP address, fip, and a foreign port number, fp. The local address, lip, and local port, lp, may refer to an address and a port, respectively, which are located at the receiving host 101. The local port may refer to an application that is executing at the receiving host 101. The foreign address, fip, and foreign port, fp, may refer to an address and a port, respectively, which are located at the transmitting host 100 that transmitted the packet which was received by the receiving host 101. The foreign port may refer to an application that is executing at the transmitting host 100.

The protocol identifier may identify a transport protocol that is being utilized to communicate the received packet to a receiving host 101 via a network 115. Examples of transport protocols may comprise, but are not limited to, TCP, and UDP. The protocol identifier may reference an entry in the protocols table 202 as shown in FIG. 2. An entry in the protocols table 202, for example TCP, may reference a location to the beginning of the lookup table of TCB pointers, T 204. A combination comprising an lip, lp, fip and fp may be referred to as a tuple. Elements within the tuple may be retrieved from the TCP packet header and/or IP datagram header. The tuple (lip, lp, fip, fp) may comprise a search key that is utilized to index a location within the lookup table T 204. The indexed location within the lookup table T 204 may comprise an identifier that indicates a location in memory 106 at which a referenced TCB 206 may be stored.

At least a portion of the protocols table 202, table of TCB pointers 204, and/or referenced TCB 206 may be stored within cache memory that is accessible by a CPU 102. A portion of the protocols table 202, table of TCB pointers 204, and/or referenced TCB 206 may be stored within main memory. A transfer rate achieved by the cache memory may be higher than the transfer rate achieved by the main memory. The amount of time that is required to perform a table lookup may vary based on the location of the referenced entry in the TCP lookup table T 204. For example, less time may be required to perform a table lookup when the referenced entry in the lookup table T 204 is located within cache memory, than may be the case when the referenced entry in lookup table T 204 is located within main memory but not within cache memory. Similarly, less time may be required to fetch a TCB content when the referenced TCB 206 is located within cache memory, than may be the case when the referenced TCB 206 is located within main memory but not within cache memory. A table lookup that locates a referenced TCB 206 within cache memory may be referred to as a cache hit. A table lookup that does not locate a referenced TCB 206 within cache memory may be referred to as a cache miss.

FIG. 3 is a block diagram of an exemplary processor system comprising cache memory, which may be utilized in connection with an embodiment of the invention. Referring to FIG. 3 there is shown a processor integrated circuit (IC) 302, an L3 cache data RAM 304, and main memory 306. The processor IC 302, or processor, may comprise a fetch block 308, a decode and rename block 310, an address calculation block 312, a load and store block 313, a data (D) cache 314, an instruction (I) cache 316, an L2 cache 318, and an L3 cache tag RAM 320. The L3 cache tag RAM 320 may store a plurality of tag sets 334. The tag set 334 may comprise a plurality of addresses that may be utilized to retrieve or store data 330 within the L3 cache data RAM 304. The L3 cache data RAM 304 may store a plurality of data 330. The D cache 314, and the I cache 316 may form constituent components in an L1 cache. The L3 cache tag RAM 320 and the L3 cache data RAM 304 be components in an L3 cache. The L1 cache, L2 cache, and/or L3 cache may individually or collectively be referred to as cache memory. The data 330 may comprise a cache line.

The L3 cache data RAM 304 may comprise suitable logic, and/or circuitry that may be configured to store data. The L3 cache data RAM 304 may comprise a plurality of integrated circuits, utilizing SRAM technology for example, that may be located externally from the processor integrated circuit 302. An integrated circuit may also be referred to as a chip. The main memory 306 may comprise suitable logic, and/or circuitry that may be configured to store data. The main memory 306 may comprise a plurality of integrated circuits, utilizing for example DRAM technology, which may be located externally from the processor integrated circuit. The L3 cache tag RAM 320 may comprise suitable logic, and/or circuitry that may be adapted to store a plurality of tag sets 334, each comprising one or more address fields that may be utilized to read data from, or write data to, an addressed location within the L3 cache data RAM 304, and/or within the main memory 306. The address field may be referred to as a tag field. The L3 cache tag RAM 320 may be located internally within the processor IC 302. The L3 cache tag RAM 320 may comprise a plurality of tags sets 334. For each tag within the tag set 334, there may be a corresponding cache line within the L3 cache data RAM 304. Limitations in the physical dimensions of the processor IC 302, may impose limitations on the size of the L3 cache tag RAM 320. Limitations on the size of the L3 cache tag RAM 320 may impose limitations on the number of tag fields within the L3 cache tag RAM 320. Limitations on the number of tag fields within the L3 cache tag RAM 320 may impose limitations on the number of cache lines within the L3 cache data RAM 304.

The fetch block 308 may retrieve or store one or more lines of executable code that is stored in the I cache 316. The decode and rename block 310 may receive an instruction from the fetch block 308. The decode and rename block 310 may perform suitable operations to translate the received instruction. The address calculation block 312 may compute an address based on input received from the decode and rename block 310. The load and store block 313 may receive one more or more data words. A data word may comprise a plurality of binary bytes. The load and store block 313 may retrieve or store data words, or data, from or to the D cache 314. The load and store block 313 may utilize an address received from the address calculation block 312. The load and store block 313 may store data in main memory 306, at an address location based on the input received from the address calculation block 312.

The D cache 314 may retrieve or store data from or to the L2 cache 318. The I cache 316 may retrieve or store instructions from or to the L2 cache 318. The L2 cache 318 may retrieve or store data 330 from or to the L3 cache data RAM 304. The data 330 may be stored at an address location based on a corresponding tag 334. The tag 334 may be computed based on an address that was computed by the address calculation block 312. A processor 302 may cause the L2 cache 318 to retrieve or store instructions from or to the L3 cache data RAM 304. The instructions may be stored as data 330 in the L3 cache data RAM 304. A processor 302 may cause the L3 cache to retrieve or store data or instructions from or to the main memory 306. The data or instructions may be retrieved from or stored to a location in the main memory 306 based on an address that was computed by the address calculation block 312.

Figure 4A:
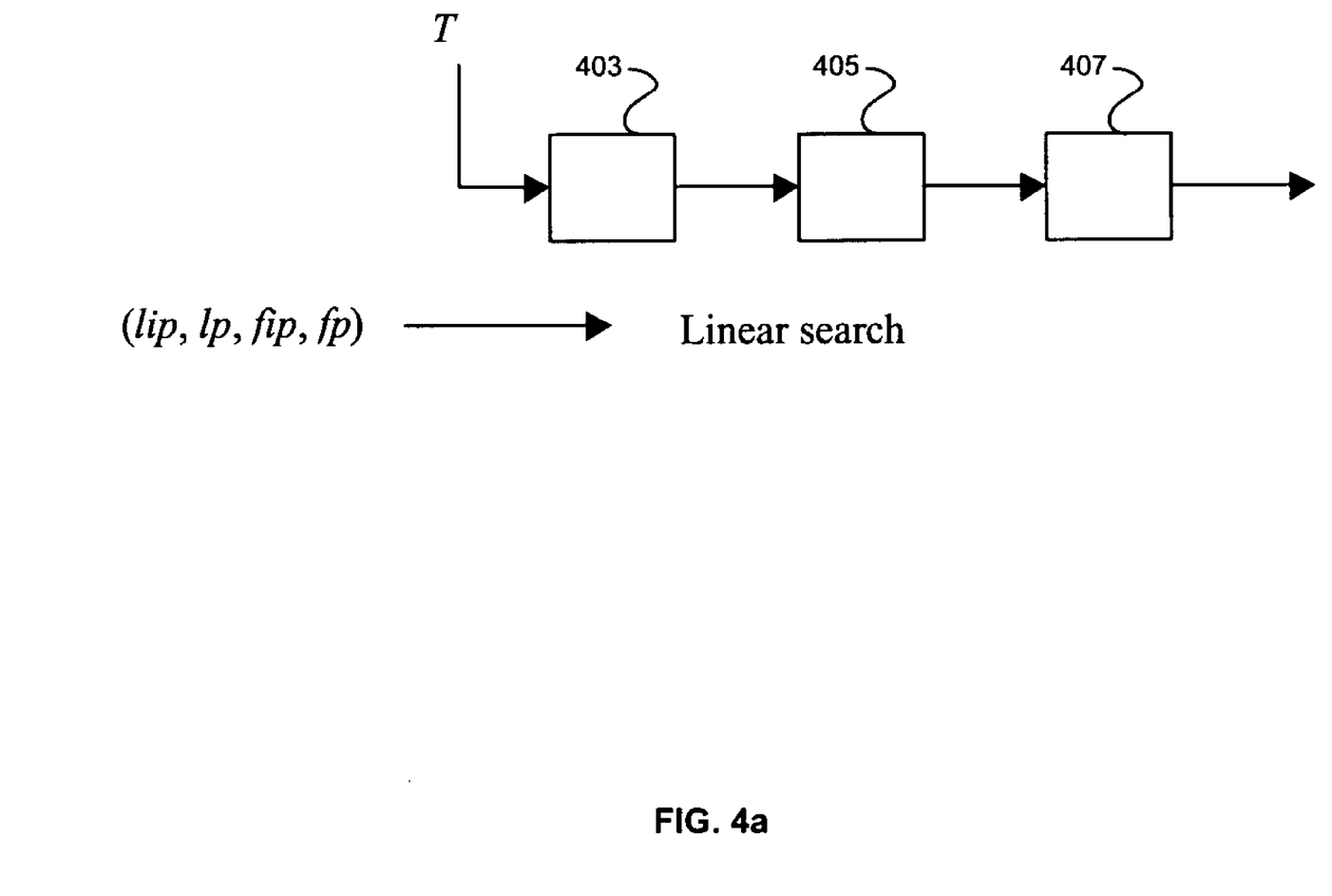
FIG. 4a is a block diagram illustrating an exemplary linear search for a referenced TCB that may be utilized in connection with an embodiment of the invention.

FIG. 4*a* is a block diagram illustrating an exemplary linear search for a referenced TCB that may be utilized in connection with an embodiment of the invention. Referring to FIG. 4*a* there is shown a plurality of TCBs 403, 405 and 407. The TCB 403 may comprise a pointer that indicates a location associated with the TCB 405. The TCB 405 may comprise a pointer that indicates a location associated with the TCB 407. The TCB 407 may comprise a pointer that indicates a location associated with a subsequent TCB. A preceding TCB may comprise a pointer that indicates a location associated with the TCB 403. Collectively, the plurality of TCBs 403, 405, 407, and/or preceding TCBs and/or subsequent TCBs may form a linked list.

In operation, a table lookup operation to locate a target TCB 407 may comprise a linear search process that traverses each element in the list of TCBs 403, 405 and 407 in a fixed order, as illustrated in FIG. 4a. For example, if the TCB 403 is the first TCB in the linked list, a search key, comprising the tuple (lip, lp, fip, fp), may be compared to information that is stored in association with the TCB 403. If the information stored within the TCB 403 corresponds to the search key, the TCB referenced by the tuple may be located. If the TCB 403 is not the referenced TCB, a pointer stored in association with the TCB 403 may be utilized to indicate the location associated with the TCB 405. The tuple may be compared to information that is stored in association with the TCB 405. If the TCB 405 is not the TCB referenced, a pointer stored in association with the TCB 405 may be utilized to indicate the location associated with the TCB 407. The tuple may be compared to information that is stored in association with the TCB 407. The process of inspecting TCBs 403, 405 and/or 407 in order may be referred to as traversing the linked list.

Figure 4B:
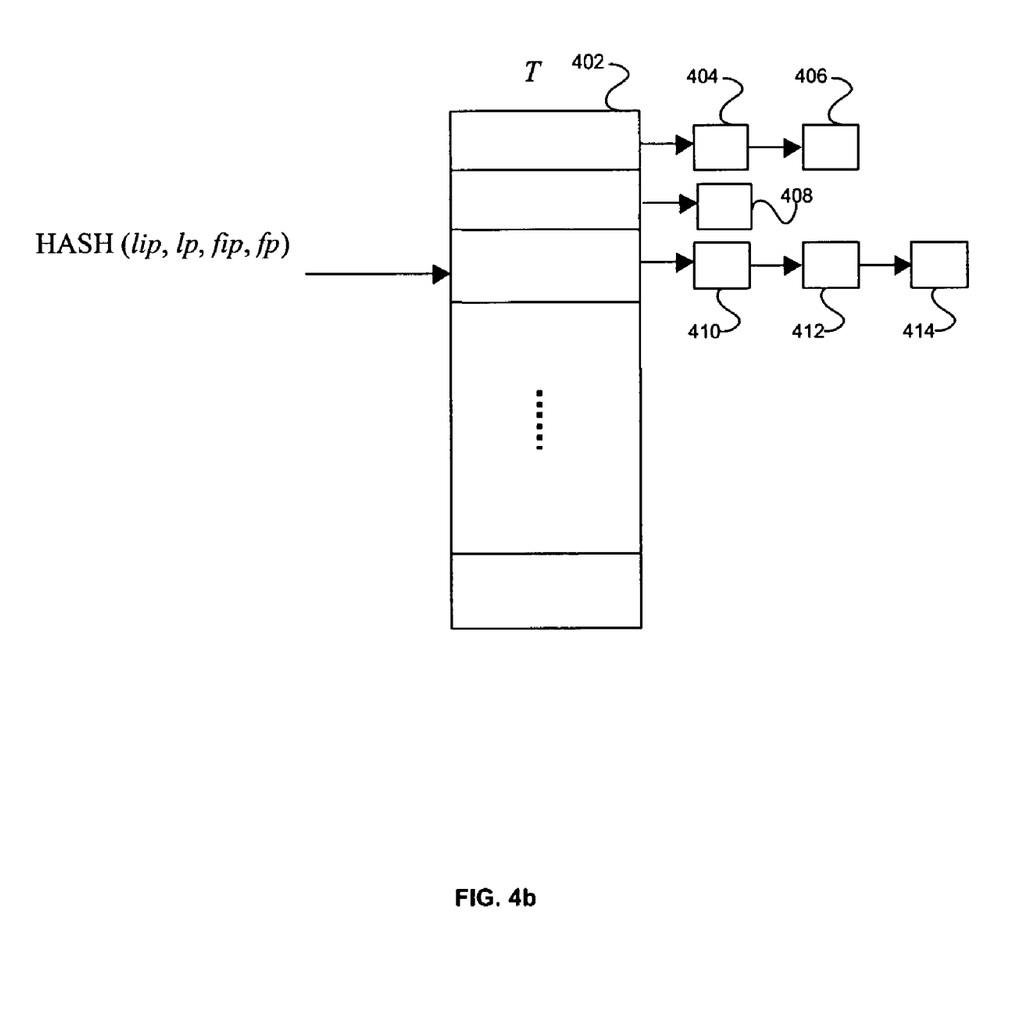
FIG. 4b is a block diagram illustrating an exemplary hash table search for a referenced TCB that may be utilized in connection with an embodiment of the invention.

FIG. 4b is a block diagram illustrating an exemplary hash table search for a referenced TCB that may be utilized in connection with an embodiment of the invention. Referring to FIG. 4b, there is shown a table of hash bucket chain pointers, T 402, and a plurality TCBs 404, 406, 408, 410, 412 and 414. The TCBs 404 and 406 may form a hash bucket chain comprising 2 TCBs, for example. The TCB 408 may form a hash bucket chain comprising 1 TCB, for example. The TCBs 410, 412 and 414 may form a hash bucket chain comprising 3 TCBs, for example. A hash bucket chain may comprise a linked list as described with regard to FIG. 4a.

As illustrated in FIG. 4b, the table of hash bucket chain pointers 402, or hash table, may comprise a plurality of pointers. Each pointer in the hash table 402 may indicate a location within the cache memory and/or memory 115 at which a hash bucket chain is stored. A hash function may utilize a search key, comprising the tuple (lip, lp, fip, fp), to generate a hash index. The hash index may be utilized to indicate a location within the hash table 402 wherein a selected one of a plurality of pointers is stored. The selected one of the plurality of pointers may be utilized to locate a first TCB in a corresponding hash bucket chain. The tuple (lip, lp, fip, fp) may be utilized, in a method substantially as described in FIG. 4a, to traverse the located hash bucket chain during a search for a referenced TCB.

The performance of systems which implement the schemes illustrated in FIGS. 4a and 4b may degrade when there is a large number of TCBs to be searched. Since one or more TCBs to be searched in a linked list or hash chain may not be located in a cache at the time of the search, the schemes illustrated in FIGS. 4a and 4b may also result in cache misses, and correspondingly poor system performance. The search process, as depicted in FIG. 4a and 4b, may access one or more TCB blocks before locating the referenced TCB as identified by the tuple (lip, lp, fip, fp), which is associated with the received packet. The accessing of one or more TCBs during a search for the referenced TCB may result in an increase in the number of cache misses. When a cache miss occurs, the operation of the processor 302 may be temporarily suspended while data is retrieved from relatively slow, non-cached, main memory 306. Consequently, cache misses may reduce the level of system performance.

Various embodiments of the invention may comprise a method that improves cache system performance for the lookup of data structures, for example TCBs, which maintain state information associated with a network connection. In an exemplary embodiment of the invention, data structures may be organized within memory such that the amount of memory and/or locations within the memory, wherein a plurality of N TCBs may be stored, may be pre-allocated. Within this organization, the TCBs may be logically numbered from 0 to N−1, for example. A numeric index Idx, where the index Idx may comprise a number that is within the range of numbers {0. . . N−1}, may be utilized to locate a referenced TCB from among the plurality of N TCBs, for example. If the index Idx comprises 16 binary bits, for example, the value of N may be a number that is less than 65536.

A single read or write operation, when performed on a cache memory, may access information contained in a single cache line. In some conventional methods of table lookup, a single cache line may comprise information associated with a single TCB. The ability to retrieve information associated with a plurality of TCBs within a single cache line may reduce the amount of time required to locate a TCB during a table lookup operation. In various embodiments of the invention, a single cache line may comprise information associated with a plurality of TCBs. The single cache line, which may comprise 32 bytes for example, may be referred to as a "bucket". In one aspect of the invention, a signature function F( ) may be referred to as a canonicalization function that produces a corresponding canonicalization tag. The signature function F( ) may utilize inputs, for example two 32 bit integers, to generate an output, for example a 32 bit integer. The signature function F( ) may be computed by a processor 302. The signature function F( ) may also be referred to as a canonicalization function. The canonicalization tag may comprise information that indicates a location associated with a TCB 206. A cache line may comprise a plurality of canonicalization tags. Thus, a single accessed cache line may comprise a plurality of tags that may be utilized to locate a corresponding plurality of TCBs. A processor 302 may compare a tuple (lip, lp, fip, fp) with each of the plurality of canonicalization tags contained within the cache line. A TCB referenced by the tuple may be determined based on the comparisons. For example, if the tuple matches to information contained in at least one of the canonicalization tags, the referenced TCB may be located.

Various embodiments of the invention may comprise a method and a system by which tags, associated with a plurality of TCBs, may be evaluated based on a single cache memory access. A determination may be made that one of the TCBs referenced by a selected one of the plurality of tags may be the referenced TCB. The selected one of the plurality of tags may be subsequently utilized to locate the referenced TCB 206. The evaluating of a plurality of tags in a single cache memory access may enable a determination that a received tuple does not reference a given TCB without retrieving the actual TCB from cache memory or main memory 306. Consequently, various embodiments of the invention may reduce the number of TCBs that are accessed when searching for a referenced TCB 206.

By contrast, in some conventional approaches, a single TCB may be retrieved and the tuple utilized to determine if the retrieved TCB is the referenced TCB 206. If the referenced TCB 206 is the last TCB in a linked list comprising a plurality of $N_{LL}$ TCBs, a total of $N_{LL}$ TCBs may be retrieved to locate the single referenced TCB. In various embodiments of the invention, a referenced TCB 206 may be located by performing two retrievals, for example. A first retrieval, for example, may retrieve a plurality of tags. If one of the retrieved plurality of tags corresponds to the referenced TCB 206, a second retrieval may retrieve the actual referenced TCB 206, for example.

Figure 5:
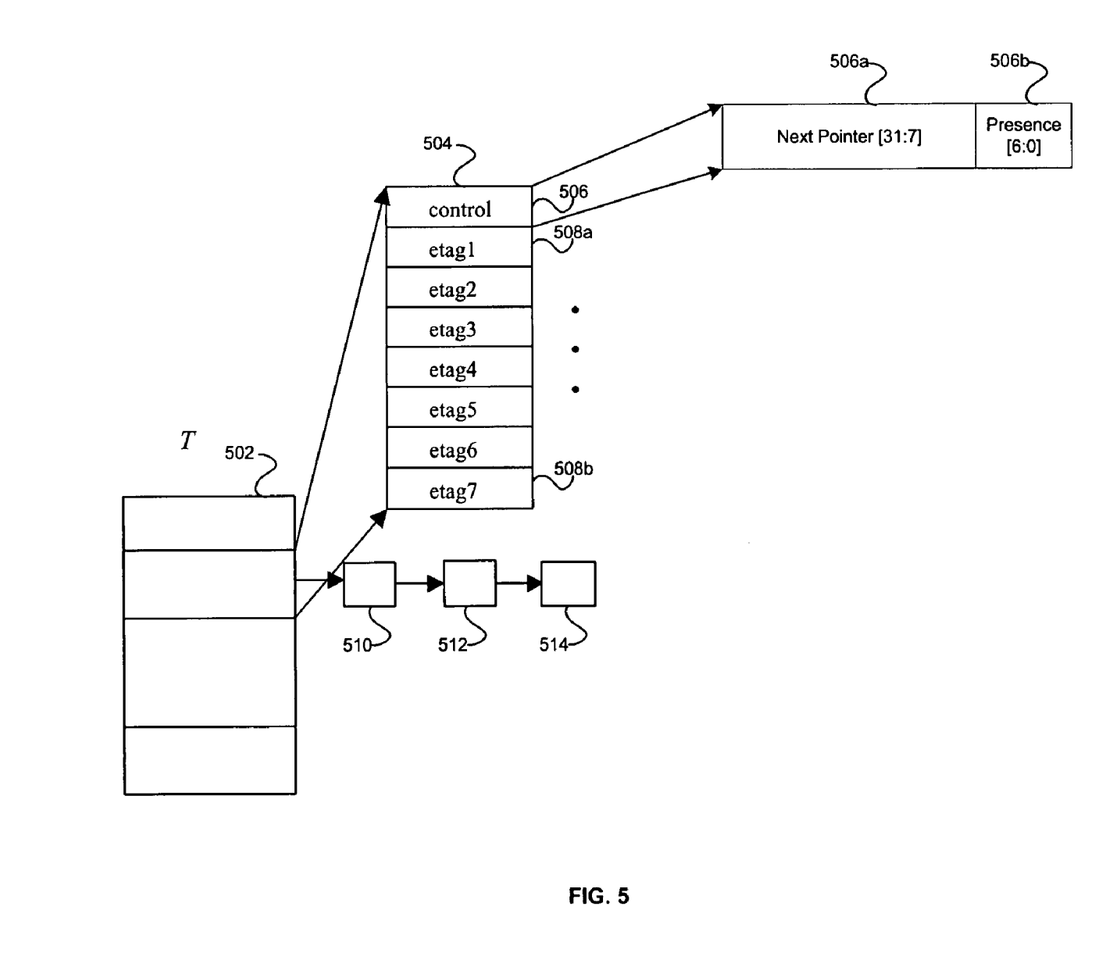
FIG. 5 is a block diagram illustrating exemplary TCP session lookup operations based on canonicalization tags, in accordance with an embodiment of the invention.

FIG. 5 is a block diagram illustrating exemplary TCP session lookup operations based on canonicalization tags, in accordance with an embodiment of the invention. Referring to FIG. 5, there is shown a hash pointer table, T 502, one of a plurality of buckets 504, a control (control) field 506, a plurality of extended tag (etag) fields 508a . . . 508b, and a plurality of buckets 510, 512 and 514. The hash pointer table 502 may be referred to as a hashed lookup table, or a lookup table. The hash pointer table, T 502, may comprise a plurality of buckets 504. The hash pointer table 502 may comprise a plurality of H entries. The hash pointer table 502 may be stored within cache memory. A bucket 504 may comprise a plurality of bytes of information, for example 32 bytes, which form a cache line. The bucket 504 may comprise a plurality of fields, for example a control field 506, and a plurality of etag fields, etag1 508a . . . etag7 508b, for example 7 etag fields. Each of the etag fields 508a . . . 508b may comprise 32 bits, for example. The control field 506 may comprise a presence field 506b and a next pointer field 506a. The presence field 506b may comprise 7 bits, for example. The next pointer field 506a may comprise 25 bits, for example. Each bucket 504 that is located within the hash pointer table 502 may comprise a first bucket 504 in a linked list comprising a plurality of buckets 504, 510, 512 and 514.

A single bit in the presence field 506b may indicate whether a corresponding extended tag field 508a . . . 508b comprises a valid value. The next pointer 506a may be utilized to locate a subsequent bucket. The next pointer may be utilized to chain buckets in a linked list. For example, the next pointer 506a associated with the bucket 504 may indicate a location associated with the bucket 510. The next pointer associated with the bucket 510 may indicate a location associated with the bucket 512, for example. The next pointer associated with the bucket 512 may indicate a location associated with the bucket 514, for example.

When a new network connection is created between a host 101 and a host 100, a new TCB 206 may be created. A corresponding new etag may also be created. The new etag may be entered into an existing bucket 504, or a new bucket may be created. If a new bucket is created, a new entry may be created in the hash pointer table 502. The new hash pointer table entry may refer to the new bucket. The new etag may be entered into the new bucket. A corresponding bit in the presence field 506b within the new bucket may indicate a valid etag value has been entered into the new bucket. Subsequently, when a host 101 receives a packet that is associated with the network connection, the host 101 may perform a table lookup operation to locate the corresponding TCB 206. Various embodiments of the invention may not be limited to connection oriented network protocols, such as TCP, but may also be applied to connectionless network protocols, such as UDP. Various embodiments of the invention may not be limited to network protocols, but may also be applied to other communication methods by which a transmitting host 100 and one or more receiving hosts 101 may exchange information via a network 115.

Figure 6:
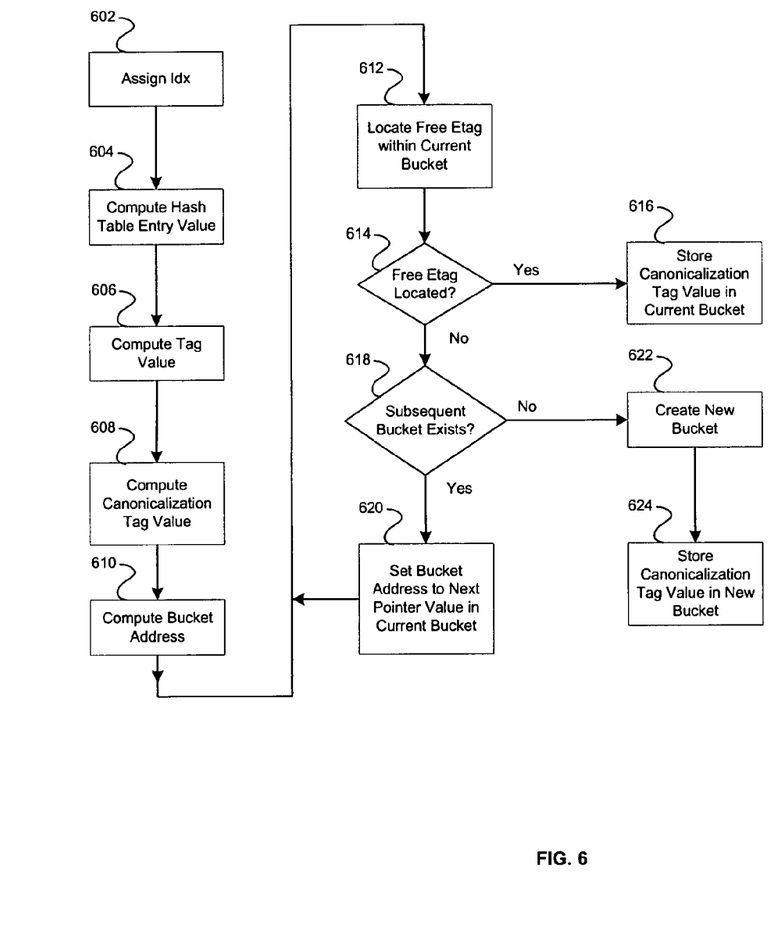
FIG. 6 is a flowchart that illustrates exemplary steps for creating a lookup table entry, in accordance with an embodiment of the invention.

FIG. 6 is a flowchart that illustrates exemplary steps for creating a lookup table entry, in accordance with an embodiment of the invention. Referring to FIG. 6, in step 602, a value may be assigned to the index Idx. The value may be associated with a TCB 206. The Idx may identify a resource that is being allocated at the host 101 for the receipt and/or transmission of packets. The number of resources available at the host 101 may be limited to a plurality of N resources, for example. The number of TCBs may correspond to the number of available resources at the host 101. Consequently, the plurality of distinct values of the index Idx may comprise a range 0 to N−1, for example.

In step 604, a value for a hash table entry, h=HASH(lip, lp, fip, fp) for example, may be computed. The value h may indicate one of a plurality of buckets 504 that may be contained within the hash pointer table 502. The number of buckets that may be contained within the hash pointer table 502 may be limited to a plurality of H buckets, for example. Consequently, the plurality of distinct values of the value h may comprise a range 0 to H−1, for example. In step 606 a tag, tag=TAG(lip, lp, fip, fp) for example, may be computed. The tag may comprise an identifier that corresponds to a tuple comprising (lip, lp, fip, fp). The tag function TAG( ) may utilize the tuple as an input and generate a tag that comprises 32 bits, for example. In step 608 an etag 508a, etag=F(tag, (~Idx<<16|Idx)) for example, may be computed. The etag 508a may comprise a canonicalization tag that is generated by the canonicalization function F( ). The etag 508a may be a lookup table entry that is being generated. The canonicalization function F( ) may generate the complement value ~Idx, which comprises a bit-complemented version of the index Idx, for example. The canonicalization function F( ) may generate a bit-shifted version of ~Idx, ~Idx<<16 for example. The canonicalization function F( ) may concatenate the index Idx and the bit-shifted version of ~Idx, ~Idx<<16|Idx, for example.

In step 610, a bucket address, bucket_address=T[h], may be generated. The value T[h] may identify a location, within the hash pointer table 502, wherein a current bucket 504 may be located. The lookup table entry being created may be stored within the located current bucket 504. In step 612, a free etag 508a may be located within a current bucket 504. An etag 508a may be determined to be free if it does not currently comprise a valid value. An etag 508a may be determined to currently comprise a valid value based on a corresponding bit within the presence field 506b. Step 614 may determine whether a free etag 508a was located within the current bucket 504. If a free etag 508a is located within the current bucket 504, in step 616, a value associated with the computed canonicalization tag, etag, may be stored in the current bucket 504.

If a free etag 508a was not located within the current bucket 504, in step 618, the control field 506 may be inspected to determine whether there is a valid next pointer 506a value that may be utilized to locate a subsequent bucket 510. If there is a valid next pointer 506a value within the control field 506 of the current bucket 504, in step 620, the value of the bucket_address may be set equal to the value of the next pointer 506a and the subsequent bucket 510 may become the current bucket. Step 612 may follow. If a next pointer value was not found within the control field in step 618, step 622 may create a new bucket within a linked list that comprises the current bucket 504. If the current bucket does not comprise a valid next pointer value, the current bucket may be the last bucket 514 in a linked list of buckets. A new bucket_address may also be computed. The address may reference a pre-allocated location within memory. The next pointer 506a value for the current bucket 504 may be set equal to the value for the new bucket_address. In step 624, a value associated with the computed canonicalization tag, etag, may be stored within the new bucket.

Figure 7:
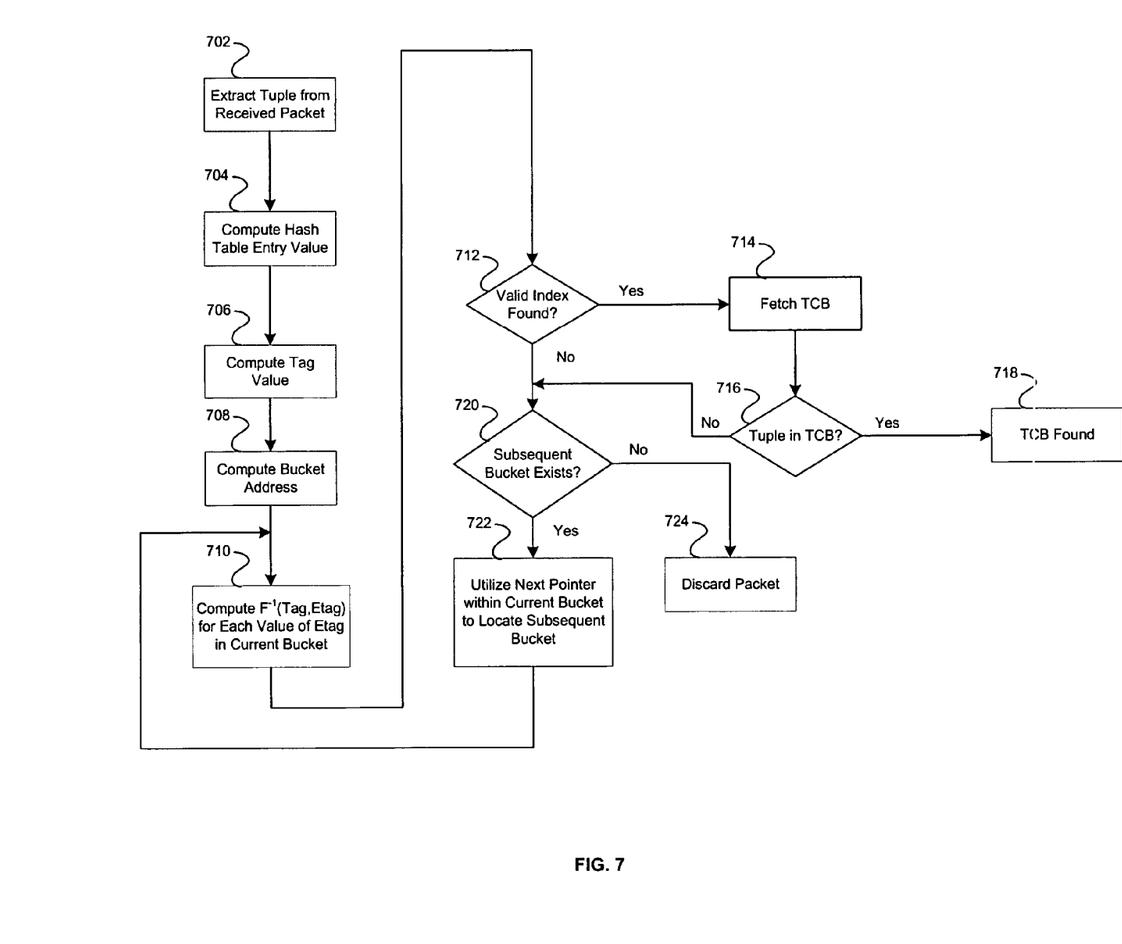
FIG. 7 is a flowchart that illustrates exemplary steps by which a table lookup operation may be performed, in accordance with an embodiment of the invention.

FIG. 7 is a flowchart that illustrates exemplary steps by which a table lookup operation may be performed, in accordance with an embodiment of the invention. Referring to FIG.

7, in step 702, a tuple (lip, lp, fip, fp) may be extracted from a received packet. In step 704, a value for a hash table entry, h=HASH(lip, lp, fip, fp) for example, may be computed. In step 706, a tag, tag=TAG(lip, lp, fip, fp) for example, may be computed. In step 708, a bucket address, bucket_address=T[h], may be generated. In step 710, for each valid value etag 508a within the bucket 504, a value of the index, IDX, IDX=$F^{-1}$(tag, etag) for example, may be computed. The inverse function $F^{-1}$( ) may be defined such that if F(a,b)=c, then $F^{-1}$(a,c)=b. An exemplary signature function F( ), which has desired characteristics in a corresponding inverse function, may comprise an exclusive-or operation.

Step 712 may determine if the index IDX comprises a valid value for the index Idx. The value of the index IDX may be approximately equal to the expression (~Idx<<16|Idx), for example. A value for Idx may be determined to be valid if the value is within the range 0 to N−1, for example. The value for Idx may be determined based on a least significant plurality of bits, for example 16, from the index IDX. If the index IDX is found to comprise a valid value for the index Idx in step 712, the value of the index Idx may indicate a location for the TCB 206 corresponding to the received tuple (lip, lp, fip, fp). If a valid value Idx is found in step 712, in step 714, the TCB 206 may be fetched at a location indicated by the index Idx. If a valid value Idx is not found in step 712, step 720 may follow.

Step 716, may validate the located TCB 206 to determine whether the located TCB 206 comprises the tuple (lip, lp, fip, fp). If the located TCB 206 comprises the tuple (lip, lp, fip, fp), in step 718, the TCB corresponding to the received packet may be found. If a valid value Idx is not found in step 712, step 720 may determine whether there is a subsequent bucket 510 to the current bucket 504. The existence of a subsequent bucket 510 may be determined based upon the value of the next pointer within the current bucket 504. If a subsequent bucket 510 is found to exist in step 720, in step 722, the value of the next pointer within the current bucket 504 may be utilized to access the subsequent bucket 510. Step 710 may follow. If a subsequent bucket 510 is not found to exist in step 720, in step 724 the received packet may be discarded at the host 101.

Various embodiments of the invention may effectively reduce the search key size from 96 bits to 32 bits when utilizing the IPv4 protocol, for example. Consequently, the amount of space required to store the lookup table within cache memory and/or system memory may be less than that which is required for some conventional lookup table methods. This may, in turn, increase the probability of a cache hit when performing a table lookup in various embodiments of the invention. Furthermore, the ability, in various embodiments of the invention, to inspect information associated with a plurality of TCBs 206 within a single cache line may result in fewer cache access operations during each table lookup operation when compared to some conventional table lookup methods. As a result, the amount of time required to locate a TCB 206 during a table lookup operation, in various embodiments of the invention, may be less than the amount of time required with some conventional table lookup methods.

Various embodiments of the invention may not be limited to TCP, but may be applied to a plurality of protocols, such as UDP or sequenced packet exchange (SPX), for example. Various embodiments of the invention may not be limited to IP but may be applied to a plurality of protocols, such as IP version 6 (IPv6), or inter-network packet exchange (IPX), for example. Various embodiments of the invention may not be limited to tuples that may be specified by (lip, lp, fip, fp), as the invention may be practiced with a plurality of specifications for a tuple.

Various embodiments of the invention may be implemented in, but not limited to, processors 302 that may be utilized in embedded processor, and/or other special purpose processor applications. Various embodiments of the invention may be implemented in, but not limited to, processors that are utilized with network interfaces cards (NIC) 110.

A system for receiving information via a communications network may comprise a processor 302 that searches a plurality of tag fields 508a, retrieved via a single memory read operation, to locate a reference to a control block 206 comprising context information for a communication session. The processor 302 may retrieve the plurality of tag fields 508a at a location based on a hash table entry value that is computed based on packet header information. The processor 302 may compute an address corresponding to the plurality of tag fields 508a based on the hash table entry value. The single memory read operation may utilize the address. The processor 302 may compute a tag value base on the packet header information. The tag value and/or hash table entry value may be computed based on a local IP address, a local port, a remote IP address, and/or a remote port. A current index value may be computed based on the computed tag value and a current one of the plurality of tag fields 508a. The processor 302 may compute a subsequent index value based on the computed tag value and a subsequent one of the plurality of tag fields 508b. The processor 302 may select a valid index value from among the current index value or a subsequent index value. The control block 206 may be retrieved based on the valid index value. The processor 302 may compare at least a portion of the retrieved control block and at least a portion of the packet header information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for receiving information via a communications network, the method comprising:

search a plurality of tag fields, retrieved via a single memory read operation, to locate a reference to a control block, said control block comprising context information for a communication session;

retrieving said plurality of tag fields at a location based on a hash table entry value that is computed based on packet header information;

computing a tag value based on said packet header information; and computing one or both of said computed tag value and said computed hash table entry value, based on one or more of a local Internet protocol address, a local port, a remote Internet protocol address, and a remote port.

2. A method for receiving information via a communications network, the method comprising:

searching a plurality of tag fields, retrieved via a single memory read operation, to locate a reference to a control block, said control block comprising context information for a communication session;

retrieving said plurality of tag fields at a location based on a hash table entry value that is computed based on packet header information;

computing a tag value based on said packet header information; and computing a current index value based on said computed tag value and a current one of said retrieved plurality of tag fields.

3. The method according to claim 2, comprising computing a subsequent index value based on said computed tag value and a subsequent one of said retrieved plurality of tag fields.

4. The method according to claim 3, comprising selecting a valid index value among one or both of said computed current index value and said computed subsequent index value.

5. The method according to claim 4, comprising retrieving said control block based on said selected valid index value.

6. The method according to claim 5, comprising comparing at least a portion of said retrieved control block and at least a portion of said packet header information.

7. A system for receiving information via a communications network, the system comprising:

a processor that is operable to:

search a plurality of tag fields, retrieved via a single memory read operation, to locate a reference to a control block, said control block comprising context information for a communication session;

retrieve said plurality of tag fields at a location based on a hash table entry value that is computed based on packet header information;

compute a tag value based on said packet header information; and compute one or both of said computed tag value and/or said computed hash table entry value, based on one or more of a local Internet protocol address, a local port, a remote Internet protocol address, and/or a remote port.

8. A system for receiving information via a communications network, the system comprising:

a processor that is operable to:

search a plurality of tag fields, retrieved via a single memory read operation, to locate a reference to a control block, said control block comprising context information for a communication session;

retrieve said plurality of tag fields at a location based on a hash table entry value that is computed based on packet header information;

compute a tag value based on said packet header information; and to compute a current index value based on said computed tag value and a current one of said retrieved plurality of tag fields.

9. The system according to claim 8, wherein said processor is operable to compute a subsequent index value based on said computed tag value and a subsequent one of said retrieved plurality of tag fields.

10. The system according to claim 9, wherein said processor is operable to select a valid index value among one or both of said computed current index value and said computed subsequent index value.

11. The system according to claim 10, wherein said processor is operable to retrieve said control block based on said selected valid index value.

12. The system according to claim 11, wherein said processor is operable to compare at least a portion of said retrieved control block and at least a portion of said packet header information.

* * * * *

UNITED STATES PATENT AND TRADEMARK OFFICE
CERTIFICATE OF CORRECTION

| | | |
|---|---|---|
| PATENT NO. | : 7,653,070 B2 | Page 1 of 1 |
| APPLICATION NO. | : 11/228060 | |
| DATED | : January 26, 2010 | |
| INVENTOR(S) | : Fong Pong | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this
Fifteenth Day of March, 2011

David J. Kappos
*Director of the United States Patent and Trademark Office*